United States Patent [19]
Andren et al.
[11] Patent Number: 5,029,184
[45] Date of Patent: Jul. 2, 1991

[54] LOW PROBABILITY OF INTERCEPT COMMUNICATION SYSTEM

[75] Inventors: Carl F. Andren, Indialantic; Leonard V. Lucas, Palm Bay; John A. Schachte, Indialantic, all of Fla.

[73] Assignee: Harris Corporation, Melbourne, Fla.

[21] Appl. No.: 470,199

[22] Filed: Jan. 24, 1990

[51] Int. Cl.[5] .............................................. H04L 27/30
[52] U.S. Cl. .......................................... 375/1; 375/10; 380/2; 380/34
[58] Field of Search ........................ 380/34, 2, 6, 9, 28, 380/33; 375/1, 10; 364/481; 342/13, 14, 16

[56] References Cited

U.S. PATENT DOCUMENTS

| | | | |
|---|---|---|---|
| 3,605,018 | 9/1971 | Coviello | 375/1 |
| 4,393,276 | 7/1983 | Steele | 380/28 |
| 4,608,647 | 8/1986 | White et al. | 364/481 |
| 4,623,980 | 11/1986 | Vary | 380/6 X |
| 4,879,726 | 11/1989 | Kobayashi et al. | 375/1 |
| 4,933,954 | 6/1990 | Petry | 375/1 |

*Primary Examiner*—Stephen C. Buczinski
*Assistant Examiner*—Bernard Earl Gregory
*Attorney, Agent, or Firm*—Evenson, Wands, Edwards, Lenahan & McKeown

[57] ABSTRACT

A low probability of intercept communication system (CCSK)—modulates information signals onto an inverse fast Fourier transformation of a large number of simultaneous frequencies that have been determined to be reasonably 'quiet' within a given system bandwidth, so as to produce a time domain pulse waveform. The amplitude of each transmitted frequency is weighted. Within the receiver equipment of each participant in the system, the incoming pulse waveform produced by the inverse fast Fourier transformation mechanism at the source is coupled to a fast Fourier transform operator, so as to separate the time domain signal into a plurality of frequency components that contain the modulated data. These components are then convolved with a replica of the plurality of quiet channels to derive a time domain output waveform from which the data modulation can be identified and recovered. Even if a jamming threat is injected into one or more of the 'quiet' channels that has been selected as a participating carrier, by virtue of the signal analysis and recovery process employed by each unit for incoming signals, jamming spikes are effectively excised.

30 Claims, 8 Drawing Sheets

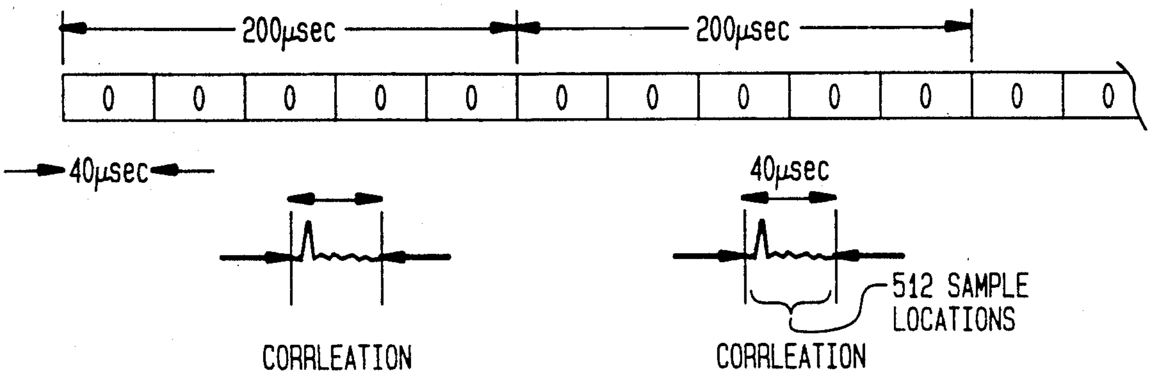
FIG. 6
FIG. 7
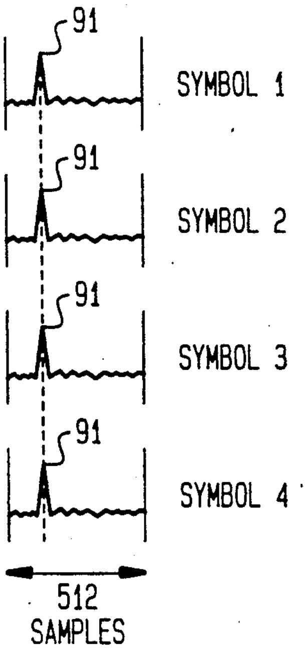

FIG. 11
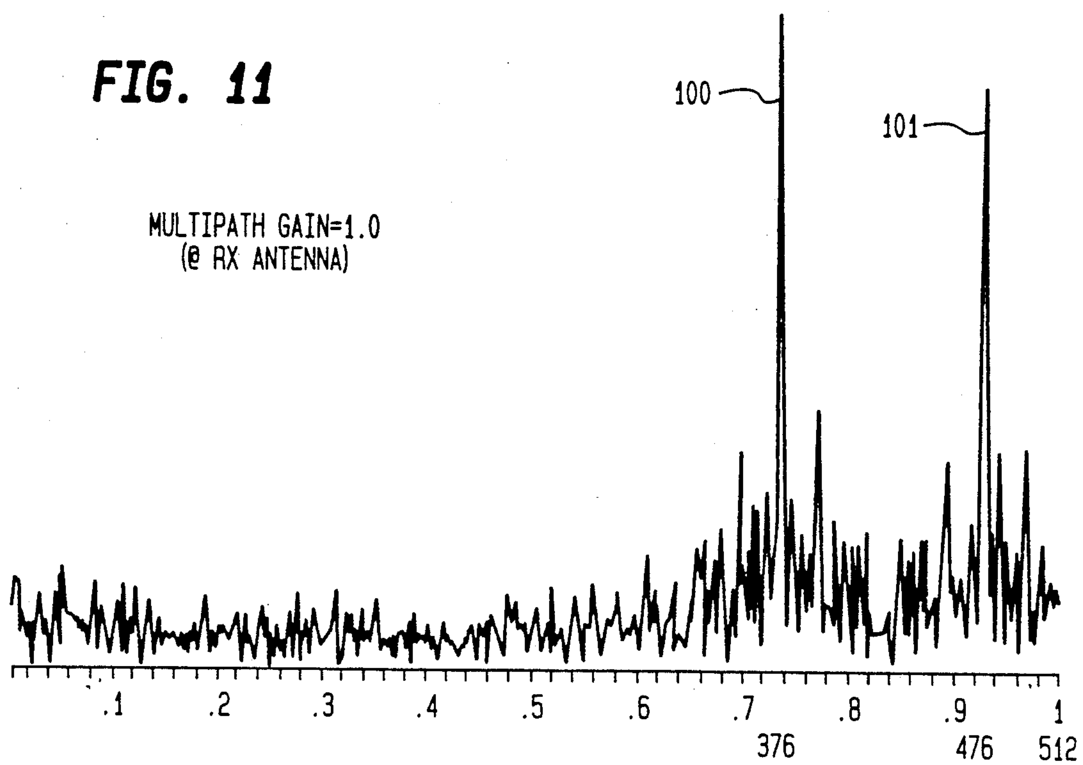
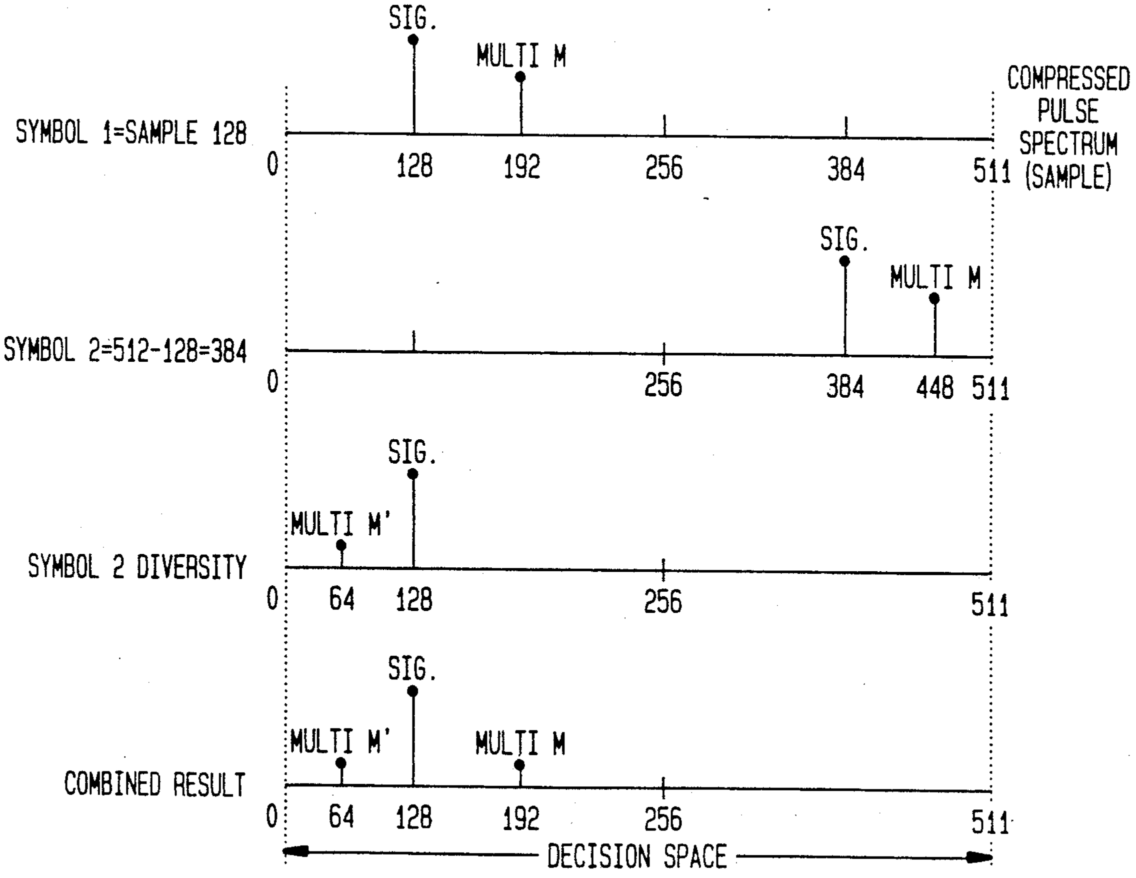
FIG. 12

LOW PROBABILITY OF INTERCEPT COMMUNICATION SYSTEM

FIELD OF THE INVENTION

The present invention relates in general to communication systems and is particularly directed to a communications system capable of successfully conducting non-corruptible, non-jammable communications in the presence of a substantial electronic warfare (EW) threat.

BACKGROUND OF THE INVENTION

The survivability and mission success of deep interdiction combat units (e.g. strike aircraft) in hostile communication environments, which contain increasingly capable and sophisticated threat detectors/receivers, require that (tactical $C^3I$) communications between units be robust and capable of defeating such threats. For example, in the typical case of a small aircraft strike force flying a low observable route deep into hostile territory, communications between aircraft must be as undetectable as possible, while still affording a reasonable data transfer rate as well as the ability to respond rapidly to environmental changes such as unintentional and intentional jamming. Although proposals to avoid detection and jamming have, in general, included the use of spread spectrum and frequency hopping techniques, the use of rapid, non-linear processing methodologies has demonstrated the vulnerability of such schemes to EW threats.

SUMMARY OF THE INVENTION

In accordance with the present invention, the ability to successfully conduct covert communications in the presence of one or more jamming threats and sophisticated non-linear signal processors, without detection, is accomplished by means of a communication system that offers low probability of intercept by modulating information signals onto an inverse fast Fourier transformation of a large number of channels (frequencies) that have been determined to be reasonably 'quiet' within a given system bandwidth. The amplitude of each transmitted channel is weighted so that the transmitted power is in the vicinity of the minimum power that will support successful reception by a destination receiver, but will be effectively 'buried in the noise' for a threat receiver outside the environment of the covert communication participants. Within the receiver equipment of each participant in the system, the incoming pulse waveform produced by the inverse fast Fourier transformation mechanism at the source is coupled to a fast Fourier transform operator, so as to separate the time domain signal into a plurality of frequency components that contain the modulated data. These components are then convolved with a replica of the plurality of quiet channels to derive a time domain output waveform from which the data modulation can be identified and recovered. Even if a jamming threat is injected into one or more of the 'quiet' channels that has been selected as a participating carrier, by virtue of the signal analysis and recovery process employed by each unit for incoming signals, jamming spikes are effectively excised.

Pursuant to a preferred embodiment of the present invention, communications are carried out in a timed burst format. Prior to a transmission, each transceiver unit that is capable of conducting low probability of intercept communications with other participants of the system conducts a measurement of a designated band of frequencies (e.g. a 10 MHz band) to determine the energy distribution within the band and thereby identify those ones of a plurality of channels into which the band has been subdivided (e.g. 400 channels equally spaced by 25 KHz) that are reasonably 'quiet', namely have an amplitude level within some prescribed noise floor window. Thus, for example, if the channel occupancy is 75% (which can be expected to be spread out over the entire 10 MHz bandwidth), there would be 100 channels available for a transmission burst. Regardless of the number chosen for transmission (which may vary from burst to burst), each of the available (e.g. 400) channels is assigned a respective amplitude (weighted by the monitored power spectrum density) and starting phase (selected pseudo randomly).

From this plurality, those channels which have been measured to be 'quiet' are subjected to an inverse fast Fourier transformation process, thereby producing a time domain pulse waveform. This waveform is then modulated with a digital information signal (e.g. using cyclic code shift keying) by controllably displacing the waveform (in time) so that its peak is shifted relative to the starting point of the burst and the remainder of the waveform is effectively wrapped around or looped on itself. The net effect is to shift or displace the phases of the plural frequencies that make up the burst in a complex manner relative to the CCSK modulation. Because the burst contains a large plurality of frequencies, each of which has been CCSK-modulated with the information signal, jamming one or several channels will not substantially degrade the energy and information within the time domain burst.

At the receiver site (e.g. another aircraft of the strike force), the multifrequency burst waveform is initially analyzed to remove potentially corrupting signals, such as jamming spikes that may have been turned on subsequent to the initial 'quiet' channel availability measurement. For this purpose, the received signal is coupled to a fast Fourier transform operator, which recovers the power spectral density of both the transmitted burst and the environment. This spectrum distribution signal is then multiplied by an independently generated replica of each of the unmodulated frequencies that were employed at the transmitter site to create the multifrequency burst. Any frequency component within the received signal that is not one of the selected N (e.g. 100) frequencies of the burst will be multiplied by zero and thereby excised from further processing. Namely, this multiplication operation removes all frequencies that were originally measured as being 'non-quiet'. In addition, any signal whose product is extraordinarily large, indicating the presence of a jamming threat, is removed from further processing.

This 'filtered' signal is then reconverted back into the time domain, by a further inverse fast Fourier transform operation, so as to permit recovery of the data. Absent the (CCSK) modulation, the 'filtering' multiplication process would effectively realign the phases of all of the received frequencies. However, because of the random phase offsets imparted by the data modulation, the product signals are coupled to an inverse fast Fourier transform operator, which, as in the transmitter, creates a time domain waveform in the form of a compressed pulse; namely, it recreates the transmitted burst waveform absent the phase randomization. Since the modulation imparted by the CCSK mechanism at the transmitter operated to shift the location (in time) at which the phases of all the frequencies of the burst are mutually aligned, the recovery process consists in locating the largest peak in the output time domain waveform and converting its temporal offset from the beginning of the burst into a data value.

For initial synchronization of system participants, an acquisition preamble, containing a continuous sequence of a preselected reference symbol followed by a repeated sequence of sets of different data symbols, is transmitted, so that the receiver can execute both waveform alignment and time slot alignment. For waveform alignment, the acquisition preamble consists of a continuous sequence of prescribed data symbols that occupy successive timeslots that make up each of a plurality of successive burst repetition intervals. Alignment with this waveform requires locating and then aligning with any of the symbols. Subsequent timeslot alignment determines during which timeslot within the burst repetition interval waveform alignment was achieved.

For this purpose, one of the system transceivers that has been designated as a master continuously (i.e. during successive time slots that make up a normal burst repetition interval) transmits a fixed PN data sequence representative of a preselected data symbol absent any cyclic phase shift, for some repeated number of successive burst repetition intervals. At each receiver site, the signal processing operators process the continuously repeated data symbol sequence, so that, for each repetition interval, the inverse Fast fourier transform operator will produce a correlation waveform representative of the data symbol. By computing the correlation phase offset between the received waveform and a stored copy in the receiver waveform alignment with one of the repeatedly transmitted symbols is achieved. To ensure a high degree of accuracy in this decision, the waveform alignment mechanism looks at the location of the peak correlation for successive reference symbols that have been processed during its processing window (that occupies a fraction of the burst interval). Upon detecting that each of some number of K processed symbols (e.g. three out of four) yields the same correlation peak location, an output signal representative of waveform alignment is generated, and the receiver switches to a time slot alignment mode.

During waveform acquisition mode, the receiver has aligned itself with one of the continuously repeated reference waveforms, but it does not know during which timeslot of the burst repetition interval the waveform was generated. To enable a receiver to locate which of the timeslots within the repetition interval it should monitor, the acquisition preamble contains a repeated sequence of mutually orthogonal symbol sets, a copy of which is maintained in memory in the receiver. Each symbol set is unique and is associated with a respective one of the timeslots of the repetition interval. The format of the timeslot alignment portion of the acquisition preamble is such that during each of the successive time slots within each of some number of successive repetition intervals of the acquisition preamble, a prescribed data symbol is generated. This data symbol is part of a set or group of data symbols that are correlatively orthogonal to one another. Each data symbol of a respective set has the same time slot location as the other symbols of the set. In accordance with a preferred mechanism for identifying with which time slot the recovered symbols are associated, as the symbols are recovered they are stored in memory. Just as in the waveform alignment mechanism, a probability of success evaluation is executed, specifically for a set of four data symbols per set, if three of a set of four consecutive data symbols match any of the reference sets (a copy of which is stored in the receiver), then a decision is made that a particular set and, correspondingly, its associated time slot, has been identified.

Tracking is preferably performed using a conventional early-late tracking discriminator, noting the location of the peak of the sampled waveform and the two sidelobes on either side of the pea sample value relative to the center of the sampling window.

Because the communication signals employed by the present invention occupy a specified pulse position within a repetition interval, the signal is subject to the influence of multipath propagation. To obviate the influence of multipath transmissions, the correlation data is processed in a diversity combiner which emphasizes the intended signal while reducing the effect of the multipath waveform. For this purpose, two symbols are sent with the sampling location of the second symbol reversed from that of the first. The second symbol is then rotated about the center of the sampling interval, which causes a complementary translation of the true signal sample location back to its original sample location, but yields a displaced multipath correlation, rather than translating it to its original location. This rotated diversity set of values is then combined with the original set by summing the logarithm values of the correlations, thereby producing an enhanced true signal and a pair of considerably lower amplitude multipath values, so that the true signal can be readily identified.

BRIEF DESCRIPTION OF THE DRAWINGS

FIG. 6 is a timing diagram of a portion of an acquisition preamble;

FIG. 7 shows a set of four successive symbol correlation waveforms;

FIG. 11 shows the correlation of direct, single path signals and multipath signals; and FIG. 12 shows the operation of a diversity combining mechanism for obviating the influence of multipath transmissions.

DETAILED DESCRIPTION

Figure 1:
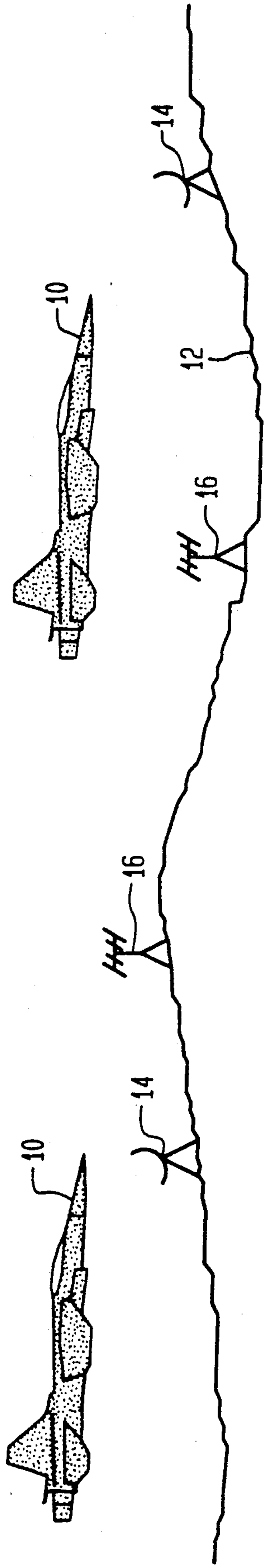
FIG. 1 illustrates a communications environment overflown by deep interdiction combat aircraft employing a low probability of intercept communication system in accordance with the present invention.

Before describing in detail the particular improved low probability of intercept covert communication system in accordance with the present invention, it should be observed that the present invention resides primarily in a novel structural combination of conventional communication and signal processing circuits and components, the timing and control of which is supervised by a programmed control processor, and not in the particular detailed configurations thereof. In addition, complex signal processing operations which involve high speed, high data density signal flow may be executed in either special purpose hardware or by means of dedicated software functionality incorporated into the control processor. Consequently, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

An exemplary communications environment in which the present invention is particularly useful and which can be expected to be encountered by deep interdiction combat aircraft 10 flying in close formation over hostile territory 12, is illustrated in FIG. 1 as containing sophisticated threat detectors/receivers 14 and jamming transmitters 16. In order not to compromise their mission, tactical $C^3I$ communications between aircraft must be robust and as undetectable as possible, while still affording a reasonable data rate, as well as being able to respond rapidly to environmental changes such as unintentional and intentional jamming.

As pointed out briefly above, pursuant to the present invention, covert communications between aircraft are successfully conducted by employing a low probability of intercept transmission technique which operates at minimum power levels and employs a large number of channels (frequencies) that have been determined to be reasonably 'quiet' within the operational bandwidth of the system. Because the number of channels is large and spread out over the communications bandwidth, a small reduction in channel usage (such as disagreement between participants as to channel selection or the unexpected injection of an undetected jammer) will not substantially impact the performance of the system.

Figure 2:
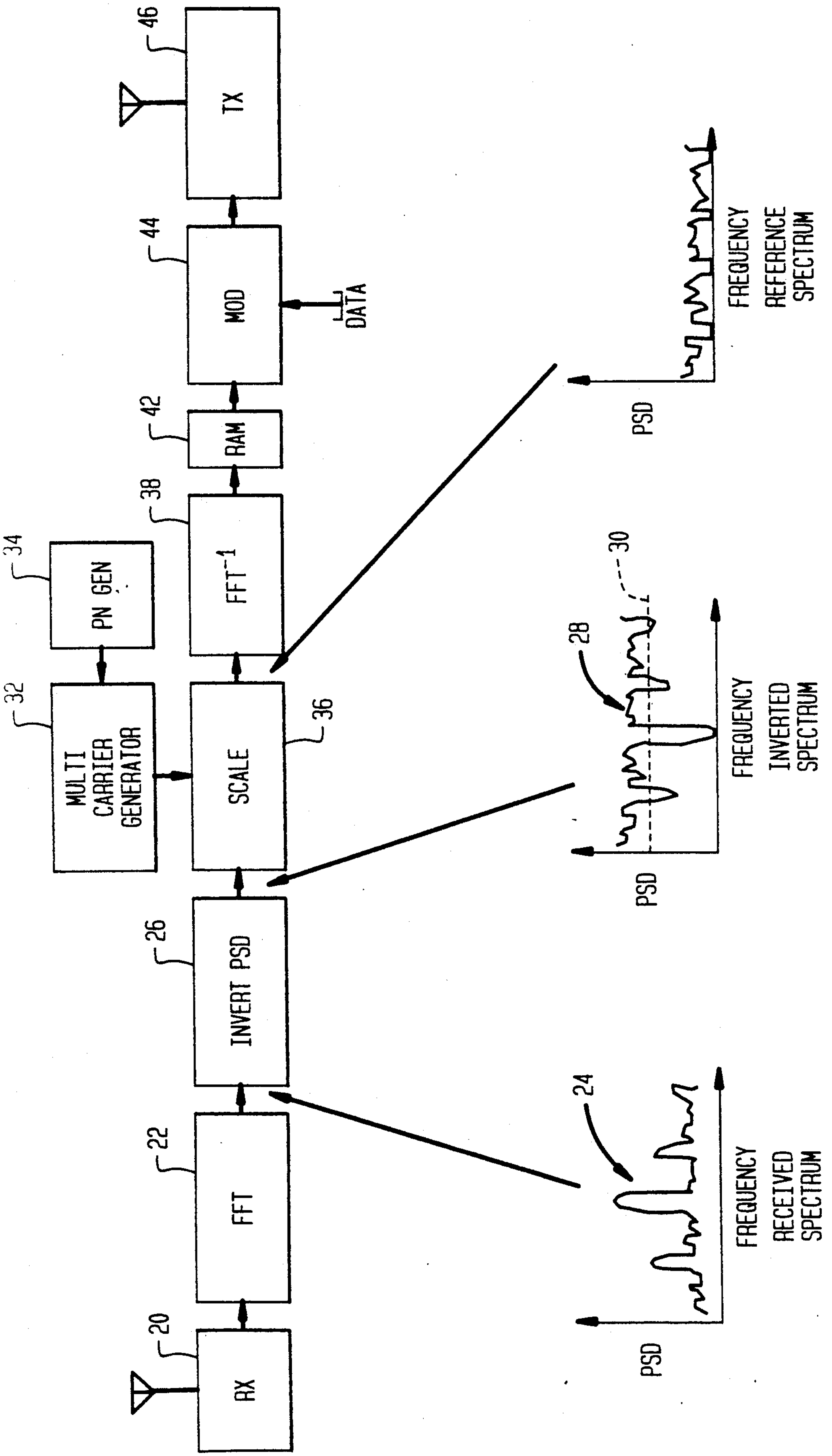
FIG. 2 is a functional block diagram of the transmit portion of a low probability of intercept transceiver.

The manner in which channels are selected may be readily understood with reference to FIG. 2, which is a functional block diagram of the transmit portion of a transceiver of a respective communication site (aircraft). As noted previously, communications are carried out in a burst format. Prior to a transmission, the transceiver unit conducts a measurement of a designated band of frequencies to determine the energy distribution within the band and thereby identify those ones of a plurality of channels into which the band has been subdivided that are 'quiet', namely have an amplitude level that is referenced to a prescribed noise floor.

For this purpose, the output of a broadband receiver 20, which monitors the communication band of interest (e.g. a 10 MHz wide spectrum), is coupled to a fast Fourier transform (FFT) operator unit 22, the output of which is represented by power spectrum density (PSD) characteristic 24. The (PSD) characteristic is then coupled to an inverter 26 which produces the inverse (PSD) characteristic 28 the average noise level of which is denoted by dotted line 30. Characteristic 28 is clipped at noise level 30 and the resulting clipped waveform is used as a scaling multiplier for setting or weighting the magnitudes of a plurality of frequencies produced by a multifrequency generator 32.

Multifrequency generator 32 is driven by a random number (PN) generator 34 to generate a series of complex numbers of constant magnitude but random phase. For a band that contains at least 400 frequencies, then, using practical parameters of current digital signal processing components, a total of 512 frequencies may be generated. For an availability of eight different phases (three bits per phase), then a PN sequence on the order of 1500 bits will fully describe the required complex waveform. For successive symbols, the phase definitions are permutated under control of PN generator 32, so that the individual frequencies will not coherently integrate from pulse to pulse.

The complex waveform produced by generator 32 is coupled to a scaling multiplier 36, which weights the amplitudes of the vectors in accordance with the reciprocal power density characteristic 28, thereby causing the reference carrier to have a magnitude so as to fill in the environment spectrum, and effectively raising the noise floor uniformly across the (10 MHz) band. Because the reciprocal of the power spectrum density is employed, non-quiet frequencies are effectively omitted from the transmission waveform. Thus, for example, if the channel occupancy is 75%, there are 100 quiet channels available for a transmission burst. Regardless of the number employed for transmission (which may vary from burst to burst), each of the available (e.g. 400) channels is assigned a starting phase (selected pseudo randomly by PN generator 34) and respective amplitude (weighted by the monitored power spectrum density in scaling operation 36).

The resulting carrier waveform is then subjected to an inverse fast Fourier transform operation 38, to produce a time domain pulse waveform represented by a block of time samples that is buffered into random access memory 42. Data modulation to be imparted to the pulse waveform delineates the starting point for reading out memory 42.

For this purpose the waveform is preferably coupled to a CCSK (cyclic code shift keying) modulator 44 which controllably displaces the time domain waveform, so that its peak is shifted relative to the starting point of the burst and the remainder of the waveform is effectively wrapped around or looped on itself. The net effect is to shift or displace the phases of the plural frequencies that make up the burst in a complex manner relative to the CCSK modulation.

Figure 3:
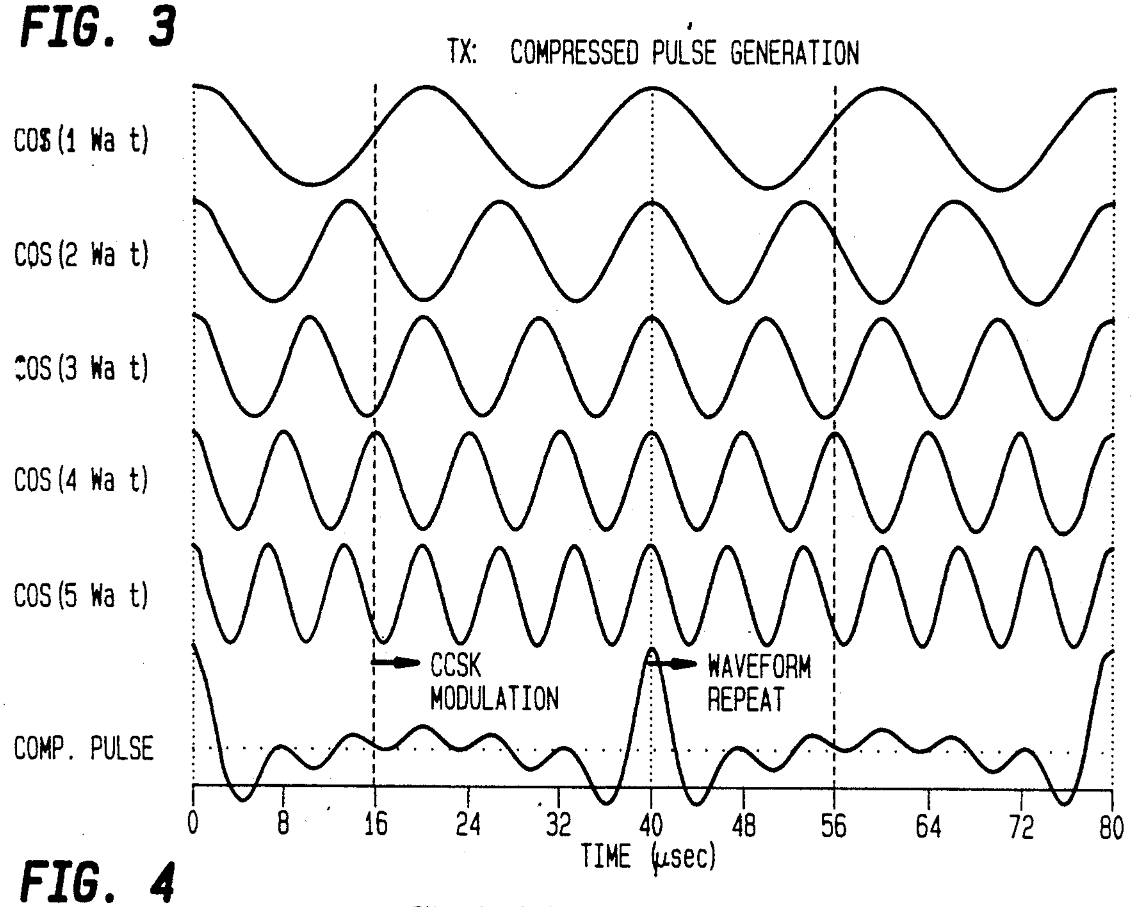
FIGS. 3 and 4 show respective sets of waveforms for demonstrating the effect of CCSK modulation on a multicarrier.
Figure 4:
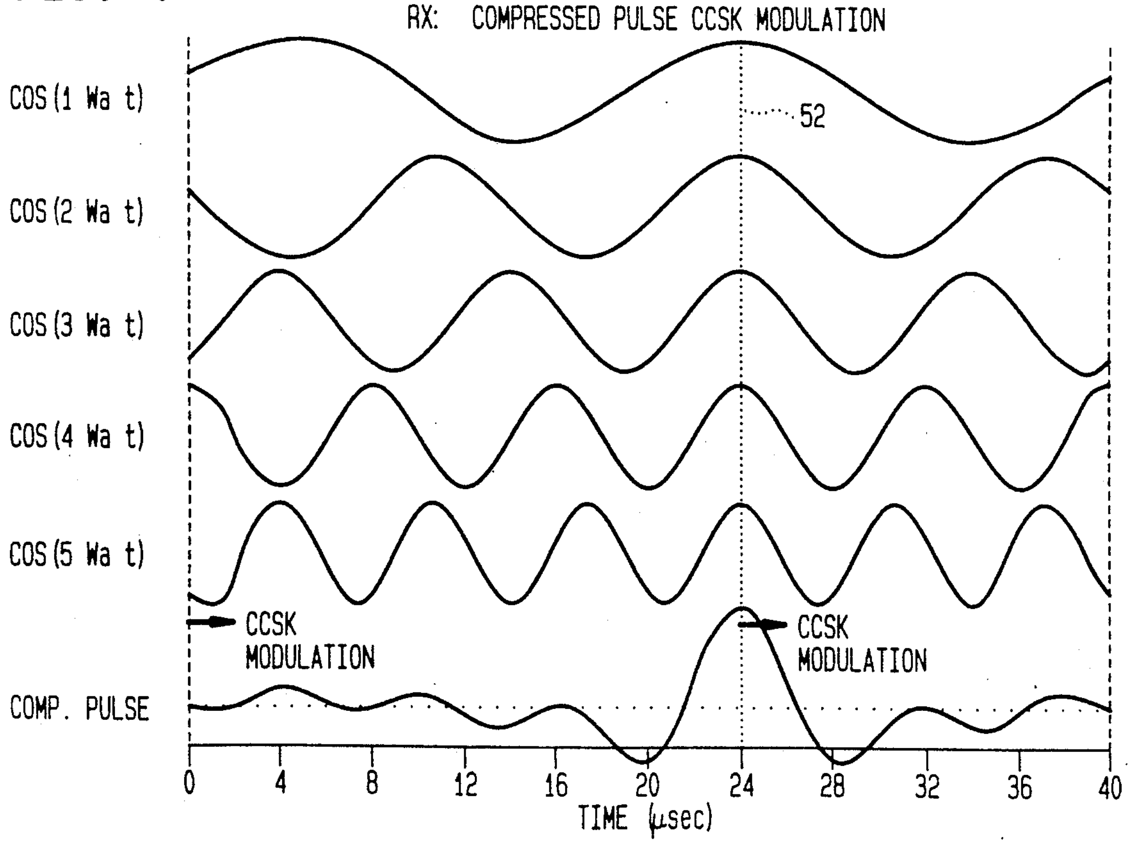

This operation may be more readily understood by reference t FIGS. 3 and 4, which show the effect of the CCSK modulation on the multicarrier signal produced by generator 32 (but without a pseudo random shifting of the phase of the individual carriers). More specifically, ignoring any amplitude weighting of the signals, the output of generator 32 may be represented as a set or plurality of well defined signals COS(1wt), COS(2wt), . . . , COS(kwt), each of which contains an integral number of cycles and has the same starting phase (e.g. phase 0, as diagrammatically illustrated in FIG. 3). The inverse transform operator 38 produces a 40 microsecond composite waveform whose peak occurs at integral cyclic multiples of the inverse Fourier transform length (e.g. zero). Imparting CCSK modulation to the output of operator 38 effectively relocates or shifts the starting phase (position) of each frequency components such that the peak of the composite is displaced in time from zero phase to some delta T offset 52, as diagrammatically shown in FIG. 4. It is this time-displaced burst that is transmitted.

As pointed out previously, a significant attribute of the use of a large number of (e.g. one to several hundred) carriers (spread out over the communication band) in accordance with the present invention is the resulting immunity of the system to both jamming and detection. Even if a hostile jammer coincides with a frequency that was originally detected to be non-quiet, its extraordinarily large amplitude will reveal it as a jammer (not a PSD-weighted carrier) and it can be excised by selective filtering. Moreover, since the data has been modulated onto a large number of carriers, eliminating one or even several frequencies will not substantially impair reception and data recovery by the receiver site. On the other hand, due to the brevity of each carrier (a burst over a small number of cycles) and the fact that the phase of each carrier differs (pseudo randomly per burst) from that of the other carriers, wrapping around on itself, a meaningful determination of phase or timing (which represents the data) by an intercept receiver is effectively impossible.

Figure 5:
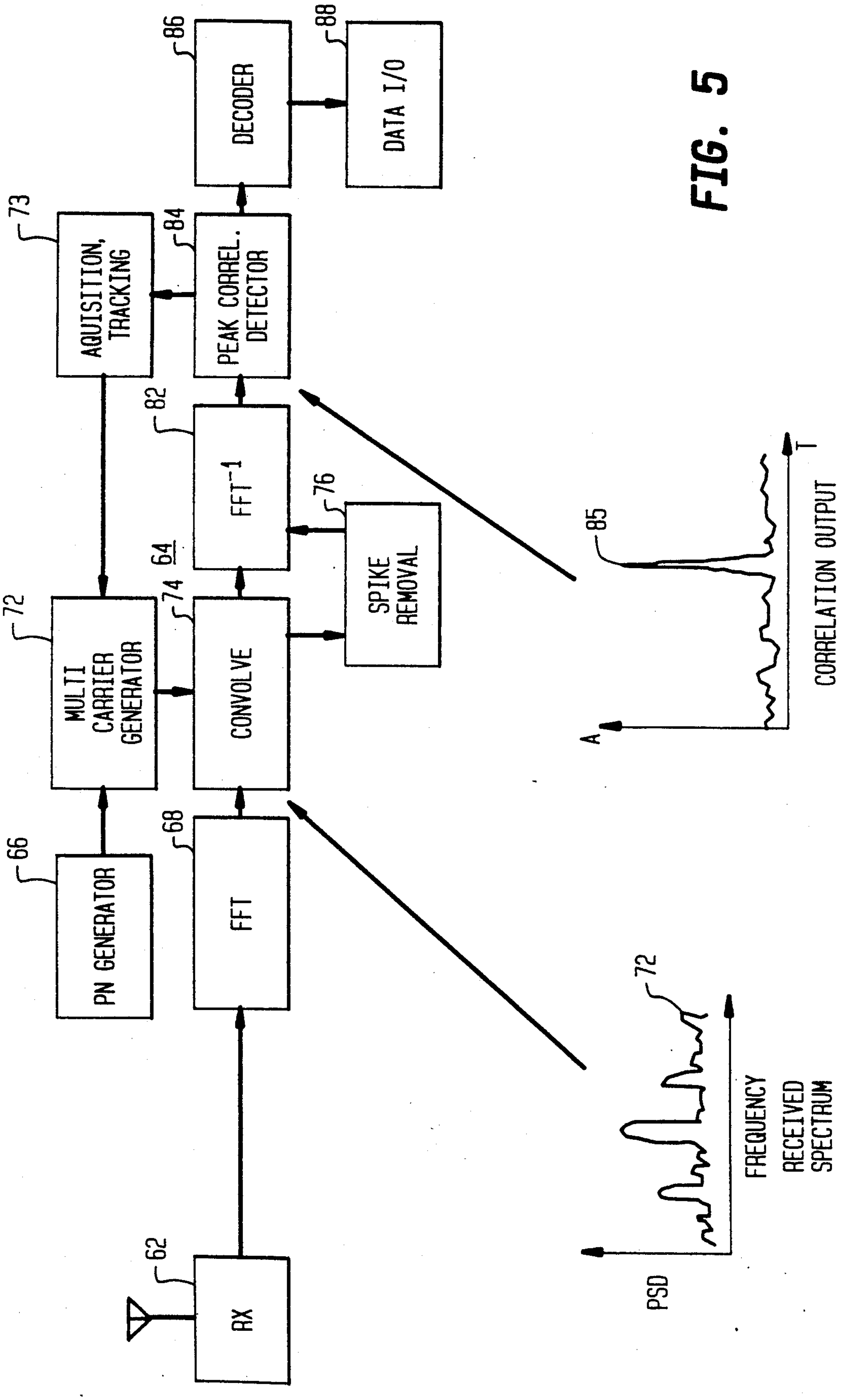
FIG. 5 is a functional block diagram of the receive, demodulation portion of a transceiver of a respective communication site of a low probability of intercept communication system.

A functional block diagram of the receive, demodulation portion of a transceiver of a respective communication site (e.g. another aircraft of the strike force), is shown in FIG. 5 as comprising a receiver unit 62 which outputs the received CCSK-modulated signals shown in FIG. 4 to a signal correlation stage 64 which serves to correlate the received signal with a copy of the unmodulated reference generated by a local carrier generator. Correlation stage 64 includes a fast Fourier transform operator 68 which, like operator 22 at the transmitter site, recovers the power spectral density characteristic 72 of whatever the receiver sees, i.e. both the signal and the environment. A local PN generator 66 drives an attendant multicarrier generator 72 which, like generator 32 in the transmitter, produces a series of complex numbers of constant magnitude but random phase, governed by PN generator 66. Generator 72 is synchronized with the incoming signal through an acquisition and tracking loop 73, to be described below. The complex waveform produced by multicarrier generator 72 is coupled to a convolver 74 which performs a complex multiplication of the received signal with the locally generated reference. The convolution operation effectively removes any received frequency components that did not effectively participate in the original set of frequencies selected to comprise the transmission reference waveform. Namely, convolution operator 74 removes those frequencies within the (10 MHz) carrier reference band that were determined to be non-quiet. In addition, a spike removal operator 78, which is coupled to the output of convolver 74, cancels any frequency within the monitored band that has an amplitude which is substantially greater than those of other components of the spectrum, thereby effectively excising jammer frequencies that may have been turned on at the time of transmission.

At this point in the signal recovery process, in the absence of the (CCSK) data modulation the phases of all the received carriers would be mutually aligned (at zero phase). However, because of the modulation, the phases of the respective carriers are offset from one another. Thus, it is necessary to convert the signal back into the time domain so that the point of time alignment, which represents the data, can be identified. Thus, the output of spike filter 76 is coupled to an inverse fast Fourier transform operation 82, so as to produce a time domain pulse waveform corresponding to the compressed pulse waveform shown in FIG. 4. Since, at the transmitter, the CCSK modulation had displaced the peak of the time domain waveform relative to the starting point of the burst, locating the peak in the recompressed time domain waveform will permit data recovery to proceed. Namely, since, the modulation imparted by the CCSK mechanism at the transmitter operated to shift location (in time) at which the phases of all the frequencies of the burst are mutually aligned, the recovery process consists in locating the largest peak (peak correlation detector 84) in the time domain waveform output of inverse Fourier transform operator 82. This time offset from the beginning of the burst is then decoded by decoder 86 into a data value 88.

ACQUISITION AND TRACKING

As pointed out above, successful operation of the receiver requires that generator 72 be synchronized with the incoming signal through an acquisition and tracking loop 73, which is coupled to a peak correlation detector 84. Acquisition preferably includes the transmission of a preamble waveform during successive time slots of successive burst repetition intervals, so that the receiver can execute both waveform alignment and time slot alignment.

WAVEFORM ALIGNMENT

More particularly, as illustrated in the timing diagram of FIG. 6, the acquisition preamble consists of a continuously repeated sequence of prescribed data symbol bursts, each of which occupies a respective one of the timeslots of which a burst repetition interval is comprised. Taking the example of a 40 microsecond burst interval and burst repetition interval of 200 microseconds, acquisition requires identifying and aligning with one of the continuously repeated 40 microsecond symbols, and then determining with which of the five possible 40 microsecond timeslots (i.e. 0–40, 40–80, 80–120, 120–160 and 160–200) within the 200 microsecond repetition interval the aligned waveform is associated. For this purpose, a preselected (master) transceiver initiates the acquisition process by transmitting a preselected PN data sequence (e.g. representative of the data symbol 'zero'), absent any cyclic phase shift, for some repeated number of successive burst repetition intervals (e.g. thirty-200 microsecond burst repetition intervals).

At each receiver site, the signal processing operator mechanism described above processes the incoming waveform during its 40 microsecond processing window, so that every 200 microseconds, inverse Fast fourier transform operator 84 will produce an output waveform representative of the total energy contained within a reference symbol sequence (although, in all likelihood, the energy being processed will be obtained from portions of two consecutive symbols). The correlation peak of the processed energy will have a peak 85 (FIG. 5), which may be defined relative to any point within the operator's processing window (e.g. referenced to the beginning of the window), so that by computing the correlation phase offset between the received waveform and a stored copy of the reference waveform, alignment with one of the five 40 microsecond timeslots within the burst repetition interval may be achieved.

The burst alignment mechanism that is executed by acquisition and tracking loop 73, which, in its preferred hardware implementation, is comprised of combinational logic and flip-flops, looks at the location of the peak correlation for successive ones of the recovered reference symbol bursts output by inverse fast Fourier transform operator 84. In the digital logic implementation of loop 73 this is preferably effected by subdividing the symbol interval into some number (e.g. 512) of time bins or sample points and identifying the location of the peak amplitude values of the respective bins of successive groups of K (e.g. four) symbols. For the example of four successive symbols per group, diagrammatically illustrated in FIG. 7, the location of the peak correlation point 91 of each of symbols 1-4, 2-5, 3-6, 4-7, etc. is identified. Upon detecting that each of a plurality of K symbols (e.g. three out of four, which translates to a probability of waveform alignment of 98.6%) in the group being examined has the same peak location, an output signal representative of waveform alignment is generated, and the receiver switches to a time slot search and alignment mode, for the purpose of locating with which of the five 40 microsecond time slots within the 200 microsecond burst repetition interval uncertainty the aligned waveform is associated.

TIME SLOT ALIGNMENT

Specifically, during the above described waveform acquisition mode, the receiver has aligned itself with one of the continuously transmitted reference symbols, but it does not know during which 40 microsecond time slot within the 200 microsecond burst repetition interval, the aligned waveform was generated. In order for successful recovery of subsequently transmitted data, it will be necessary for the receiver to align itself with a single 40 microsecond data burst timeslot. In order to do this, the receiver must know during which of the five possible timeslots within the 200 microsecond burst repetition interval it is currently aligned. To accomplish this, following the conclusion of the sequence of reference symbols that enable the receiver to achieve waveform alignment, (e.g. a continuously repeated sequence of thirty 'zero'-representative data symbols, as described above), the acquisition preamble contains a repeated sequence of mutually orthogonal symbol sets, a copy of which is maintained in memory in the receiver. Each symbol set is unique and is associated with a respective one of the (five) timeslots of the 200 microsecond repetition interval.

Figure 8:
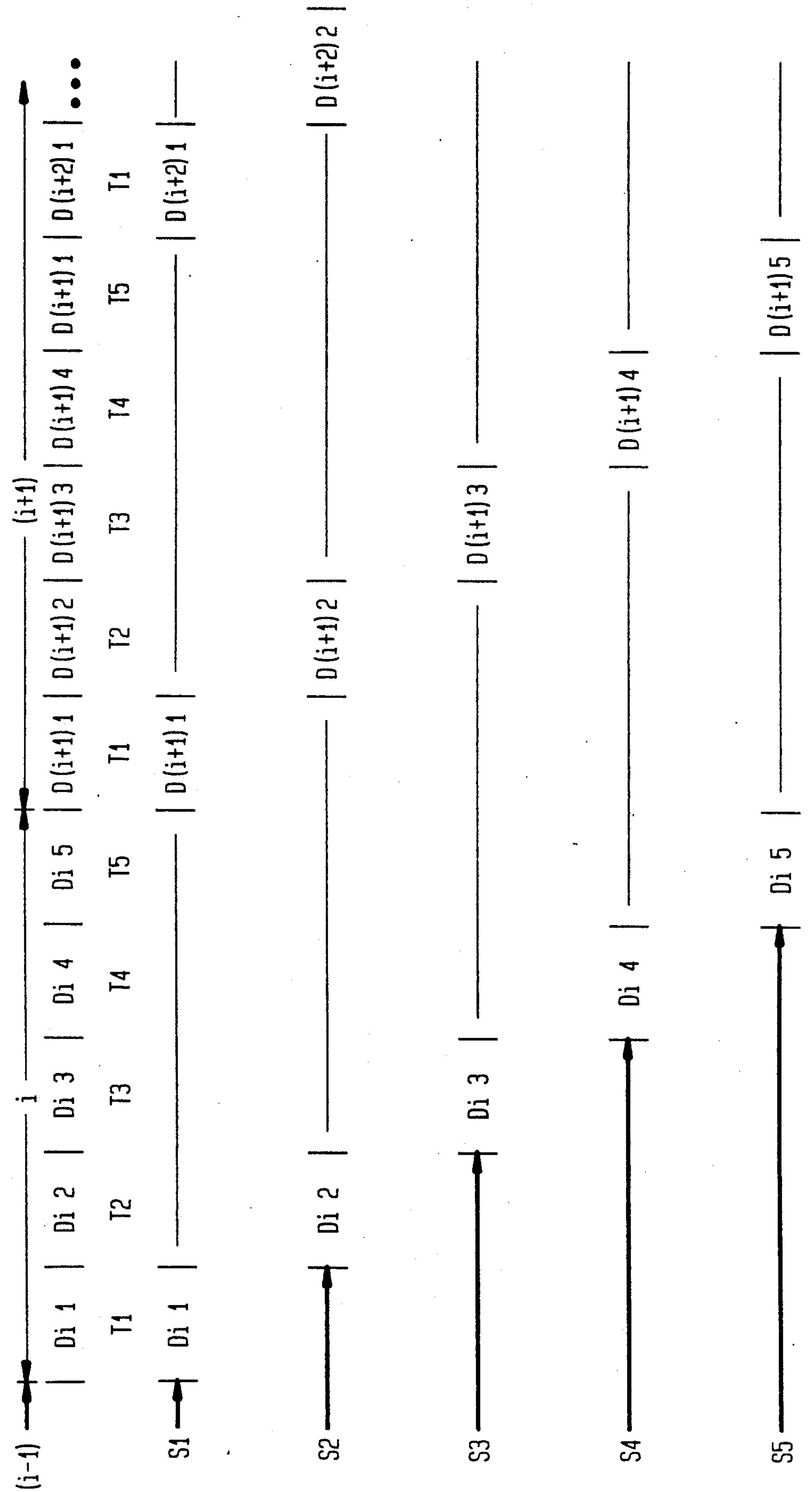
FIG. 8 shows a timing diagram containing five successive time slots T1 . . . T5 within continuously repeated burst repetition intervals of an acquisition preamble.

More particularly, as illustrated in FIG. 8, during each of the five successive 40 microsecond time slots T1 . . . T5 within each of the continuously repeated (200 microsecond) burst repetition intervals (e.g. four successive intervals i, i+1, i+2, i+3) of the acquisition preamble, a respective data symbol is generated. This data symbol is part of a set or group of data symbols that are correlatively orthogonal to one another. Each data symbol of a respective set has the same 40 microsecond time slot location as the other symbols of the set. In the timing diagram of FIG. 8, therefore, the five consecutive time slots T1-T5 of interval i contain respective data symbols Di1, Di2, Di3, Di4 and Di5 associated with four successive data sets S1, S2, S3 and S4, each data set Sj comprising successive data symbols Dij, D(i+1)j, D(i+2)j and D(i+3)j, where j=1-5. During repetition interval i+4, the data symbols of repetition i are repeated, and so on, for a prescribed plurality of intervals of the acquisition preamble, so as to provide sufficient opportunity for the receiver to successfully execute time slot alignment, as will be described below.

Figure 9:
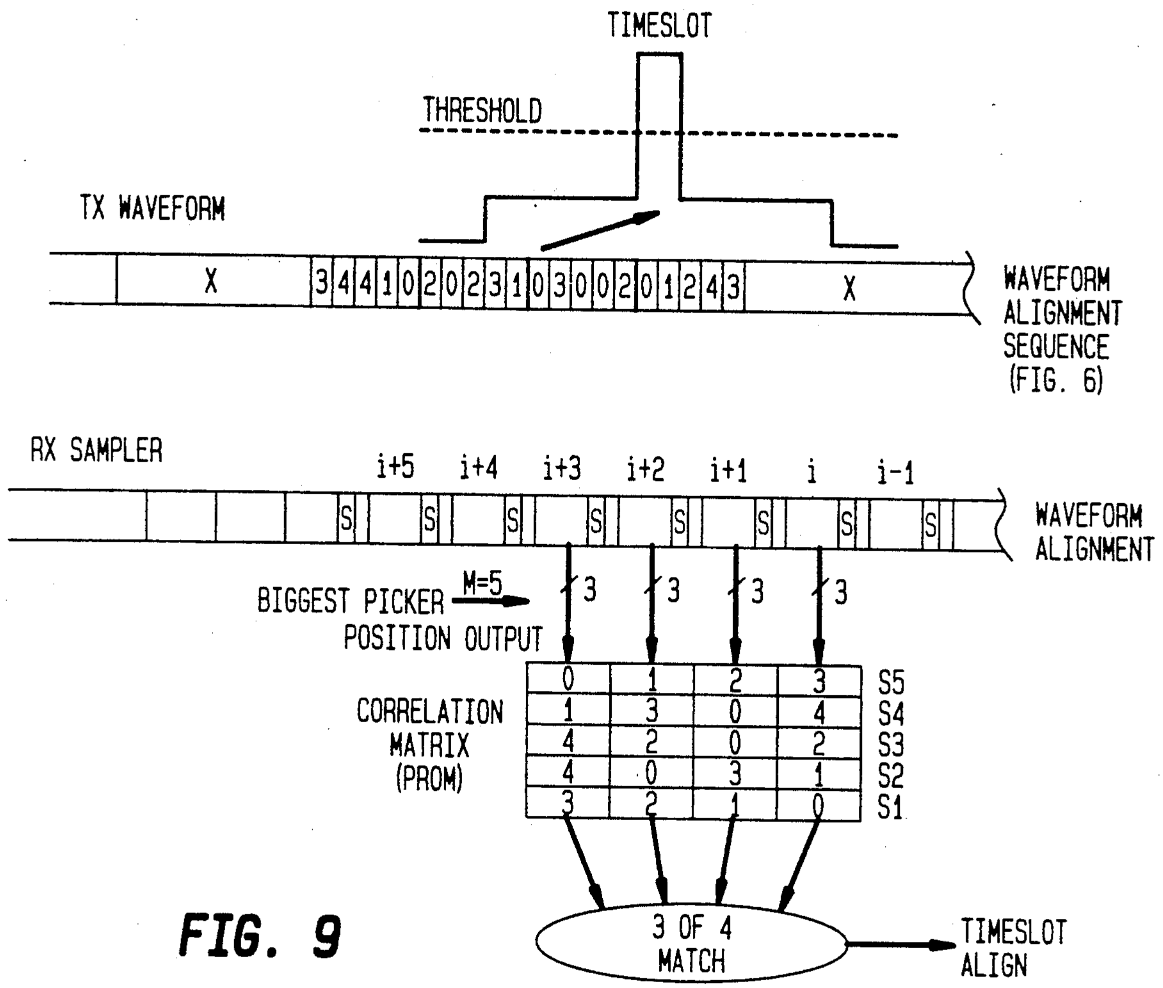
FIG. 9 shows exemplary data values for five mutually orthogonal symbol sets S1–S5 that may be used for time slot alignment.

FIG. 9 shows exemplary data values for five mutually orthogonal symbol sets S1-S5 that may be used for time slot alignment. In accordance with a preferred mechanism for identifying with which time slot the recovered symbols are associated, as the symbols are recovered they are stored in memory. Just as in the waveform alignment mechanism, described earlier, a probability of success evaluation is executed. Specifically, for a set of four data symbols per set Sj, if three of a set of four consecutive data symbols match those of any reference set (a copy of each of which is stored in the receiver), then a decision is made that a particular set and, correspondingly, its associated time slot, has been identified. Thus, considering set S2, for example, for repetition intervals i, i+1, i+2 and i+3, the set is defined by the numerical sequence 4031. For this four repetition interval (i.e. i through i+3), as long as any one of the sequences 4031, X031, 4X31, 40X1 and 403X is detected, a match is declared and the time slot with which the receiver is aligned is identified as time slot T2.

It should be noted that, because of the mutual orthogonality of the symbols sets, for the next three out of four comparison, involving repetition intervals i+1, i+2, i+3 and i+4, for symbol set S2, the possible successful (or 'match') symbols sequences 0314, X314, 0X14, 13X4 and 031X cannot be mistaken for any of the sequences of the other data sets S1, S3-S5. This property holds for all subsequent sets of four consecutive repetition intervals, so as to ensure the accuracy of the time slot identification using a three out of four match. Numerically, the probability of the accuracy of the identified time slot is 99.94 percent.

Tracking is preferably performed using a conventional early-late tracking discriminator, noting the location of the peak of the sampled waveform and the two sidelobes on either side of the peak sample value relative to the center of the sampling window.

MULTIPATH PROTECTION

Figure 10:
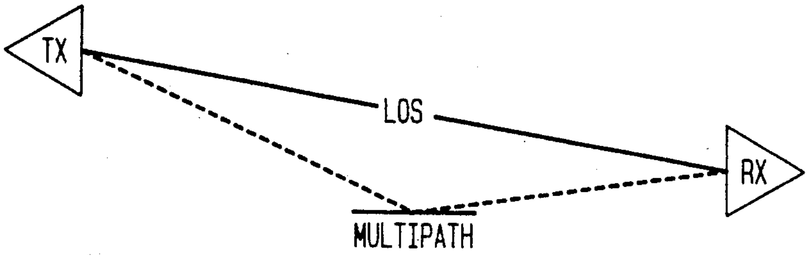
FIG. 10 diagrammatically illustrates a multipath transmission including a direct aircraft-to-aircraft transmission path and an aircraft-to-ground-to-aircraft transmission path.

Because the communication signals employed by the present invention occupy a specified pulse position within a repetition interval the signal is subject to the influence of multipath propagation, e.g. direct aircraft-to-aircraft and aircraft-to-ground-to-aircraft, as diagrammatically shown in FIG. 10. Like direct, single path signals, multipath signals will correlate in the receiver and produce a replica compressed pulse, as identified at 101 in FIG. 11, correlation 100 corresponding to the intended direct path signal.

To obviate the influence of multipath transmissions, the correlation data is processed in a diversity combiner which emphasizes the intended signal while reducing the effect of the multipath waveform. For this purpose, as shown in FIG. 12, the sampling location of a second pulse is subtracted from the pulse length effectively reversing or mirror imaging the pulse. Taking an example of a first symbol SIG located at sample 128 and a multipath correlation M located at sample 192, the mirror imaging translates the second symbol SIG to sample location 384 and the corresponding multipath M to sample location 448. The second symbol values are then rotated about the center (256) of the 512 sample locations interval, which causes a complementary translation of the signal SIG′ back to its original sample 128 location, but yields a displaced multipath correlation M′ at sample location 64, rather than its original sample location 128. This rotated diversity set (SIG and M′) is then combined with the original set, SIG and M, (preferably by summing the logarithm values of the correlations to defeat strong multipath) thereby producing an enhanced true signal SIG′+SIG. and a pair of considerably lower amplitude multipath values M and M′, so that the true signal SIG can be readily identified.

As will be appreciated from the foregoing description, pursuant to the present invention, the ability to successfully conduct covert communications in the presence of one or more jamming threats and sophisticated non-linear signal processors, without detection, is accomplished by means of a communication system that offers low probability of intercept by modulating information signals onto an inverse fast Fourier transformation of a large number of channels (frequencies) that have been determined to be reasonably 'quiet' within a given system bandwidth. Even if a jamming threat is injected into one or more of the 'quiet' channels that has been selected as a participating carrier, by virtue of the signal analysis and recovery process employed by each unit for incoming signals, jamming signals can be effectively excised. second symbol values are then rotated about the center (256) of the 512 sample locations interval, which causes a complementary translation of the signal SIG′ back to its original sample 128 location, but yields a displaced multipath correlation M′ at sample location 64, rather than its original sample location 128. This rotated diversity set (SIG and M′) is then combined with the original set, SIG and M, (preferably by summing the logarithm values of the correlations to defeat strong multipath) thereby producing an enhanced true signal SIG′+SIG and a pair of considerably lower amplitude multipath values M and M′, so that the true signal SIG can be readily identified.

As will be appreciated from the foregoing description, pursuant to the present invention, the ability to successfully conduct covert communications in the presence of one or more jamming threats and sophisticated non-linear signal processors, without detection, is accomplished by means of a communication system that offers low probability of intercept by modulating information signals onto an inverse fast Fourier transformation of a large number of channels (frequencies) that have been determined to be reasonably 'quiet' within a given system bandwidth. Even if a jamming threat is injected into one or more of the 'quiet' channels that has been selected as a participating carrier, by virtue of the signal analysis and recovery process employed by each unit for incoming signals, jamming signals can be effectively excised.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A communication system for conducting low probability of intercept communications between a transmitter site and a receiver site comprising:

at said transmitter site, first means for generating, during a prescribed time slot, a plurality N of carrier frequencies having respective amplitudes, and phase angle values that are randomly distributed with respect to one another;

second means, coupled to said first means, for performing an inverse fast Fourier transformation of said plurality of carrier frequencies so as to obtain a time domain pulse waveform representative thereof; and third means, coupled to said second means, for modulating said time domain pulse waveform with information signals and transmitting said modulated time domain pulse waveform; and at said receiver site, fourth means for receiving the modulated time domain pulse waveform that has been transmitted by said transmitter site;

fifth means, coupled to said fourth means, for performing a fast Fourier transformation of the received time domain pulse waveform, so as to obtain therefrom a distribution of the frequency components thereof; and sixth means, coupled to said fifth means, for processing the frequency components obtained by said fifth means, so as to recover said information signals.

2. A communication system according to claim 1, wherein said first means includes means for monitoring communication activity over a prescribed frequency band and generating, during said prescribed time slot, a plurality N of carrier frequencies respective amplitudes of which are set in accordance with spectral characteristics of said monitored frequency band.

3. A communication system according to claim 2, wherein said first means includes means for setting the phase angles of said plurality of N carriers are set at random values.

4. A communication system according to claim 2, wherein said first means includes means for generating a multiplicity M of frequencies within said prescribed frequency band, spaced apart from one another by a selected frequency separation, and means for defining said plurality of N frequencies as those of said multiplicity M of frequencies, the communication activity of which has been measured to be within a prescribed level of the average noise within said frequency band.

5. A communication system according to claim 1, wherein said sixth means comprises means for combining said distribution of the frequency components of said received time domain pulse waveform with a replica of said plurality N of carrier frequencies to produce a multifrequency signal from which frequencies other than those of said plurality have been removed and within which the phases of the multiple frequencies of said multifrequency signal are aligned in accordance with modulation imparted by said information signal, means for performing an inverse Fourier transformation of said multifrequency signal to produce a time domain pulse waveform containing a compressed pulse at a timing representative of modulation imparted by said information signal, and means for decoding said time domain pulse waveform to recover said information signals.

6. A method of conducting covert communications in the presence of one or more jamming/intercept threats comprising the steps of:

at a transmission site, (a) modulating information signals onto an inverse fast Fourier transformation of a plurality of frequencies that have been selected within a given system bandwidth, the amplitude of each transmitted channel being weighted in accordance with the inverse power spectrum density of said bandwidth, and the phases of which are irregularly distributed, thereby producing a time domain pulse waveform;

at a reception site, (b) coupling a received time domain pulse waveform to a fast Fourier transform operator, so as to separate the time domain pulse waveform into a plurality of frequency components that contain modulated information signals;

(c) convolving the frequency components of step (b) with a replica of the plurality of frequencies so as to derive a time domain output waveform; and (d) recovering said information signals from said time domain output waveform.

7. A method according to claim 6, wherein step (a) comprises, prior to a transmission, conducting a measurement of a designated band of frequencies over which communications between said transmission and reception sites are to take place, so as to determine the energy distribution within the band and thereby identify those ones of a plurality of frequencies that are to be transmitted as part of said time domain pulse waveform.

8. A method according to claim 7, wherein step (a) further comprises modulating said time domain pulse waveform with a digital information signal so as to controllably displace the peak of the waveform in time.

9. A method according to claim 7, wherein step (a) comprises modulating said time domain pulse waveform by means of cyclic code shift keying so as to controllably displace the starting phase of each frequency component that makes up the waveform.

10. A method according to claim 9, wherein step (c) comprises multiplying the frequency components obtained by step (b) by an independently generated replica of each of the unmodulated frequencies that were employed at the transmission site to form said time domain pulse waveform and removing any signal whose product is above a prescribed value from further processing, and converting the resulting frequency domain signal into the time domain as said time domain output waveform.

11. A method according to claim 10, wherein step (c) includes the step of converting the frequency products into the time domain by an inverse fast Fourier transform operation, so as to obtain said time domain output waveform, 12. A method according to claim 11, wherein step (d) comprises locating the largest peak in said time domain output waveform and converting its temporal offset from the beginning of the waveform into an information signal value.

13. A method of conducting low probability of intercept communications between a transmitter site and a receiver site comprising the steps of:

at said transmitter site, (a) generating, during a prescribed time slot, a plurality N of carrier frequencies having respective amplitudes, and phase angle values that are randomly distributed with respect to one another;

(b) performing an inverse fast Fourier transformation of said plurality of carrier frequencies so as to obtain a time domain pulse waveform representative thereof; and (c) modulating said time domain pulse waveform with information signals and transmitting said modulated time domain pulse waveform; and at said receiver site, (d) receiving the modulated time domain pulse waveform that has been transmitted by said transmitter site;

(e) performing a fast Fourier transformation of the received time domain pulse waveform, so as to obtain therefrom a distribution of the frequency components thereof; and (f) processing the frequency components obtained by step (e), so as to recover said information signals.

14. A method according to claim 13, wherein step (a) includes monitoring a prescribed frequency band over which communications between said transmitter site and said receiver site are to take place and generating, during said prescribed time slot, a plurality N of carrier frequencies respective amplitudes of which are established in accordance with spectral characteristics of said monitored frequency band.

15. A method according to claim 14, wherein step (a) includes the step of pseudo randomly establishing the phase angles of said plurality of N carriers.

16. A method according to claim 14, wherein step (a) includes generating a multiplicity M of frequencies within said prescribed frequency band, spaced apart from one another by a selected frequency separation, and defining said plurality of N frequencies as those of said multiplicity M of frequencies, the communication activity of which has been measured to be within a prescribed level of the average noise within said frequency band.

17. A method according to claim 13, wherein step (f) comprises combining said distribution of the frequency components of said received time domain pulse waveform with a replica of said plurality N of carrier frequencies to produce a multifrequency signal from which frequencies other than those of said plurality have been removed and within which the phases of the multiple frequencies of said multifrequency signal are aligned in accordance with modulation imparted by said information signal, performing an inverse Fourier transformation of said multifrequency signal to produce a time domain pulse waveform containing a compressed pulse at a timing representative of modulation imparted by said information signal, and decoding said time domain pulse waveform to recover said information signals.

18. A method according to 13, further including the preliminary step of performing acquisition and timing alignment at said receiver site comprising the steps of:

at said transmitting site, (i) transmitting an acquisition preamble a first portion of which contains a first sequence of the same preselected information symbol, followed by plural repetitions of a second sequence of different information symbols;

at said receiver site, (ii) monitoring said acquisition preamble transmitted in step (a) to locate and align said burst recovery receiver with the occurrence of one of the same preselected information symbols in said first sequence; and (iii) monitoring said second sequence of different information symbols and deriving therefrom an indication of which of a plurality of successive timeslots, within said burst repetition interval, said burst recovery receiver is aligned.

19. A method according to claim 13, wherein step (f) includes producing a time domain correlation characteristic representative of a received information signal burst, and processing said time domain correlation characteristic so as to recover an intended information signal burst in the presence of a multipath signal burst by translating said time domain correlation characteristic by one half its time domain interval, to obtain a translated time domain correlation characteristic, rotating the translated time domain correlation characteristic about the center of the time domain interval, thereby causing a complementary translation of a desired attribute of said time domain correlation characteristic back to its original time domain location, while causing a displacement of a multipath signal correlation, and combining the original time domain correlation characteristic with the rotated characteristic, and thereby emphasizing the desired information signal attribute, so that the intended signal can be readily identified.

20. A method according to claim 19, wherein step (f) includes summing logarithmic representations of said original and rotated characteristics.

21. A communication system according to claim 20, wherein said time domain pulse waveform transmitter comprises a modulator which modulates said time domain pulse waveform with a digital information signal so as to controllably displace the peak of the waveform in time.

22. A communication system according to claim 20, wherein said time domain pulse waveform transmitter comprises a modulator which modulates said time domain pulse waveform by cyclic code shift keying so as to controllably displace the starting phase of each frequency component that makes up the waveform.

23. A communication system according to claim 22, wherein said time domain convolver comprises a multiplier which multiplies the frequency components of the received time domain pulse waveform by an independently generated replica of each of the unmodulated frequencies that were employed at the transmission site to form the transmitted time domain pulse waveform and a filter which removes any signal whose product is above a prescribed value from further processing, and inverse fast Fourier transform operator which converts the resulting frequency domain signal into the time domain as said time domain output waveform.

24. A communication system according to claim 23, wherein said decoder comprises means for locating the largest peak in said time domain output waveform and converting its temporal offset from the beginning of the waveform into an information signal value.

25. A communication system for conducting covert communications between a transmission site and a reception site in the presence of one or more jamming/intercept threats comprising, in combination:

at said transmission site, a time domain pulse waveform transmitter which modulates information signals onto an inverse fast Fourier transformation of a plurality of frequencies that have been selected within a given system bandwidth, the amplitude of each transmitted channel being weighted in accordance with the inverse power spectrum density of said bandwidth, and the phases of which are irregularly distributed, thereby producing a time domain pulse waveform; and at said reception site, a time domain pulse waveform receiver to which a received time domain pulse waveform is coupled, said receiver including a fast Fourier transform operator which separates the time domain pulse waveform into a plurality of frequency components that contain modulated information signals, a frequency domain convolver which convolves said frequency components with a replica of the plurality of frequencies so as to derive a time domain output waveform, and decoder which recovers said information signals from said time domain output waveform.

26. A communication system according to claim 25, wherein said transmission site includes a power spectrum monitor which, prior to a transmission, conducts a measurement of a designated band of frequencies over which communications between said transmission and reception sites are to take place, thereby determining the energy distribution within said designated band and identifying those ones of a plurality of frequencies that are to be transmitted as part of said time domain pulse waveform.

27. A communication system according to claim 25, further including an arrangement for aligning said time domain pulse waveform receiver with waveform bursts transmitted by said transmitter site comprising:

at a transmitting site, means for transmitting an acquisition preamble a first portion of which contains a first sequence of the same preselected information symbol, followed by plural repetitions of a second sequence of different information symbols;

at a receiver site, means for monitoring said acquisition preamble to locate and align said time domain waveform pulse waveform receiver with the occurrence of one of the same preselected information symbols in said first sequence; and means for monitoring said second sequence of different information symbols and deriving therefrom an indication of which of a plurality of successive timeslots, within said burst repetition interval, said receiver is aligned.

28. For use with a communication system in which information signals are transmitted in burst format and at a prescribed burst repetition rate, a method of aligning a burst recovery receiver with transmitted bursts comprising the steps of:

at a transmitting site, (a) transmitting an acquisition preamble a first portion of which contains a first sequence of the same preselected information symbol, followed by plural repetitions of a second sequence of different information symbols;

at a receiver site, (b) monitoring said acquisition preamble transmitted in step (a) to locate and align said burst recovery receiver with the occurrence of one of the same preselected information symbols in said first sequence; and (c) monitoring said second sequence of different information symbols and deriving therefrom an indication of which of a plurality of successive timeslots, within said burst repetition interval, said burst recovery receiver is aligned.

29. For use with a communication system in which information signal bursts are processed to produce a time domain correlation characteristic, a method of processing said time domain correlation characteristic so as to recover an intended information signal burst in the presence of a multipath signal burst comprising the steps of:

(a) sending two symbols such that the second is a time reversal of the first.

(b) rotating the time domain correlation characteristic of the second symbol in step (a) about the center of the time domain interval, thereby causing a complementary translation of a desired attribute of said time domain correlation characteristic back to its original time domain location, while causing a displacement of a multipath signal correlation; and (c) combining the original time domain correlation characteristic with the rotated characteristic, and thereby emphasizing the desired information signal attribute, so that the intended signal can be readily identified.

30. A method according to claim 29, wherein step (c) comprises summing logarithmic representations of said original and rotated characteristics.

* * * * *